United States Patent

Macheras et al.

[11] Patent Number: 5,871,680
[45] Date of Patent: Feb. 16, 1999

[54] METHOD AND APPARATUS FOR SPINNING HOLLOW FIBER MEMBRANES

[75] Inventors: James Timothy Macheras, Quincy; Thomas Anthony Bolan, Brockton; Benjamin Bikson, Brookline, all of Mass.

[73] Assignee: Praxair Technology, Inc., Danbury, Conn.

[21] Appl. No.: 907,624

[22] Filed: Aug. 8, 1997

Related U.S. Application Data

[63] Continuation of Ser. No. 497,590, Jun. 30, 1995, abandoned.

[51] Int. Cl.$^6$ .................................................. B29C 47/88
[52] U.S. Cl. .................... 264/211.14; 264/209.3; 264/211.15; 264/211.21; 264/211.23; 264/211.13; 427/245; 210/500.3
[58] Field of Search .................... 264/41, 182, 209.1, 264/561, 344, 184, 209.2, 211.16, 101, 49, 451, 562, 571, 211.12, 211.13, 211.14, 211.15, 211.21, 211.23; 427/245; 210/500.27, 500.3

[56] References Cited

U.S. PATENT DOCUMENTS

| | | | |
|---|---|---|---|
| 3,842,151 | 10/1974 | Stoy et al. | 264/203 |
| 4,214,020 | 7/1980 | Ward et al. | 427/296 |
| 4,364,759 | 12/1982 | Brooks et al. | 55/487 |
| 4,826,599 | 5/1989 | Bikson et al. | 210/500.3 |
| 4,882,223 | 11/1989 | Aptel et al. | 428/398 |
| 4,915,886 | 4/1990 | Repetti et al. | 264/41 |
| 5,181,940 | 1/1993 | Bikson et al. | 55/16 |

OTHER PUBLICATIONS

Preparation of asymmetric gas separation membranes with high selectivity by a dual–bath coagulation method, Hof, Journal of Membrane Science; 70 (1992), 17–30.

Influence of guench medium on the structures and gas permeation properties of polysulfone membranes made by wet an dry/wet phase inversion, Pinnau.

Journal of Membrane Science, 71 (1992) 81–96; Pore size control technique in the spinning of polysulfone hollow fiber ultrafiltration membranes, Doi, Desalination, 80 (1991), 167–180.

*Primary Examiner*—Merrick Dixon
*Attorney, Agent, or Firm*—Robert J. Follett

[57] ABSTRACT

A process for the preparation of anisotropic hollow fibers useful as permselective separation membranes and for producing composite membranes thereof, involves extruding a spinning dope through a spinneret that extends into a coagulation chamber maintained at subatmospheric pressure, conveying the nascent hollow fiber through a column that extends into the reduced pressure chamber, and contains at least two different abutting liquids arranged in sequence. An apparatus for conducting the process includes the vacuum chamber, the spinneret and the column that extends into the vacuum chamber and is equipped with entrance and exit ports for introduction and removal of at least two abutting liquid coagulation media.

4 Claims, 2 Drawing Sheets

METHOD AND APPARATUS FOR SPINNING HOLLOW FIBER MEMBRANES

This application is a Continuation of prior U.S. application Ser. No. 08/497,590 Filing Date Jun. 30, 1995 now abandoned.

FIELD OF THE INVENTION

This invention relates to a process for producing hollow fiber membranes that are useful for the separation of the components in fluid mixtures, such as gas or liquid mixtures.

BACKGROUND OF THE INVENTION

There are numerous examples in the literature of processes that describe the preparation of fluid separation hollow fiber membranes. These membranes can be either anisotropic, most frequently asymmetric, or isotropic, and may be useful for a variety of fluid separations, including gas separations. For example, I. Cabasso describes the procedures for preparing porous polysulfone hollow fibers in "Hollow Fiber Membranes", Kirk Othmer: Encyclopedia of Chemical Technology, 12, 3rd Edition, 492–519 (1980) and "Membranes", Encyclopedia of Polymer Science and Engineering, 9, 2nd Edition, 509–579, (1987).

Among the methods most frequently used for preparation of asymmetric membranes is the phase inversion process. The preparation of asymmetric ("skinned") membranes from polymer solutions by phase inversion methods usually involves the stages of: (1) casting the polymer solution or "dope", (2) evaporation by exposure of the cast solution to the atmosphere, (3) precipitation of the solution in coagulation media and leaching out solvents, and optionally, (4) the annealing of the membrane. Although preparation of asymmetric membranes by direct coagulation without the evaporation step is known, most industrial procedures do include this step. The importance of the evaporation step is well recognized in the art but is also highly empirical with optimal parameters such as evaporation temperature, duration of the evaporation step, etc. being determined experimentally for a particular polymer/solvent casting composition.

Preparation of anisotropic membranes present a challenge in that the morphological requirements for optimizing each section of the membrane are not necessarily the same. For example, the coagulation liquid required to form optimal surface porosity and the one required for formation of optimal sub-surface structure may be different. This means that when a single coagulant is used, it represents a compromise and neither structure is optimized or alternatively, the nascent fiber must be passed through a series of coagulant baths. An example of the latter approach can be found in J. A. van't Hof et al., "Preparation Of Asymmetric Gas Separation Membranes With High Selectivity By A Dual-Bath Coagulation Method", J. Membrane Sci., 70 (1992), pages 17–30, in which two successive non-solvent baths are used wherein the first bath initiates the formation of the exterior layer and the second bath completes the solidification process. Care must be taken in practicing this method, however, because the coagulant baths may be composed of expensive, flammable and/or toxic liquids which can escape to the surrounding environment. In addition, the fiber must pass through an air gap between the first and second non-solvent baths despite the fact that it has not been fully coagulated.

A procedure for preparing fibers from polymer solutions at subatmospheric pressure is disclosed by Stoy et al. in U.S. Pat. No. 3,842,151. According to the invention disclosed, a polymer solution is extruded through a spinneret into a tube or shaft whose upper end is sealed against gas flow by a lid connected with the spinneret, and its lower end is placed below the level of a coagulation bath open to the atmosphere. The pressure within the tube between the spinneret and the level of the coagulation bath is maintained lower than the pressure outside the tube or shaft which causes the level of the coagulation liquid to be higher in the shaft than in the outer coagulation bath. In the spinning process, the polymer solution is extruded through the spinneret into the gaseous atmosphere above the coagulation bath in the shaft, which is maintained at subatmospheric pressure. The fibers then enter the coagulation bath and after passing through the bath are collected. Vacuum means are provided to maintain the level of the coagulation bath at the desired height and provision is also made to introduce and remove gaseous medium from the shaft area between the spinneret and the top of the coagulation bath if desired.

Repetti et al. in U.S. Pat. No. 4,915,888 employ a vertical column of quench liquid which is supported by a vacuum such that the quench liquid is in contact with the spinneret outlet. This type of apparatus is conveniently used to provide a long coagulation path for nascent dope streams which are used to make microporous nylon hollow fibers.

B. Bikson et al. in U.S. Pat. No. 5,181,940 describe the use of a vacuum spinning apparatus to produce highly asymmetric hollow fiber membranes with improved fluid or gas separation properties. The spinning dope is extruded into a zone maintained at a reduced pressure as compared to the exterior of the spinning chamber and the cast dope is subjected to controlled evaporation under the subatmospheric pressure prior to being introduced into the homogeneous liquid which acts as the coagulation medium.

SUMMARY OF THE INVENTION

This invention relates to the manufacture of improved hollow fiber fluid separation membranes, to a process for producing anisotropic hollow fiber membranes for fluid separation and to the apparatus used to conduct the membrane production process. More particularly, the invention relates to a process for spinning hollow fibers in an apparatus equipped with a vacuum chamber and then precipitating the nascent hollow fiber and leaching out solvent (frequently including leaching non-solvent pore forming agents and other additives as well) by passing the nascent fiber through a plurality of quench liquids of different compositions without intermittent exposure to the surrounding atmosphere. As a result, it is possible to produce hollow fiber membranes with improved fluid or gas separation properties. The invention also more particularly relates to an apparatus which includes a spinneret extending into a vacuum chamber and a column which contains multiple abutting coagulation liquids also extending into the same vacuum chamber.

Other features and advantages of the present invention will become apparent from the following description of the invention which refers to the accompanying drawings.

DETAILED DESCRIPTION OF THE EMBODIMENTS OF THE INVENTION

Figure 1:
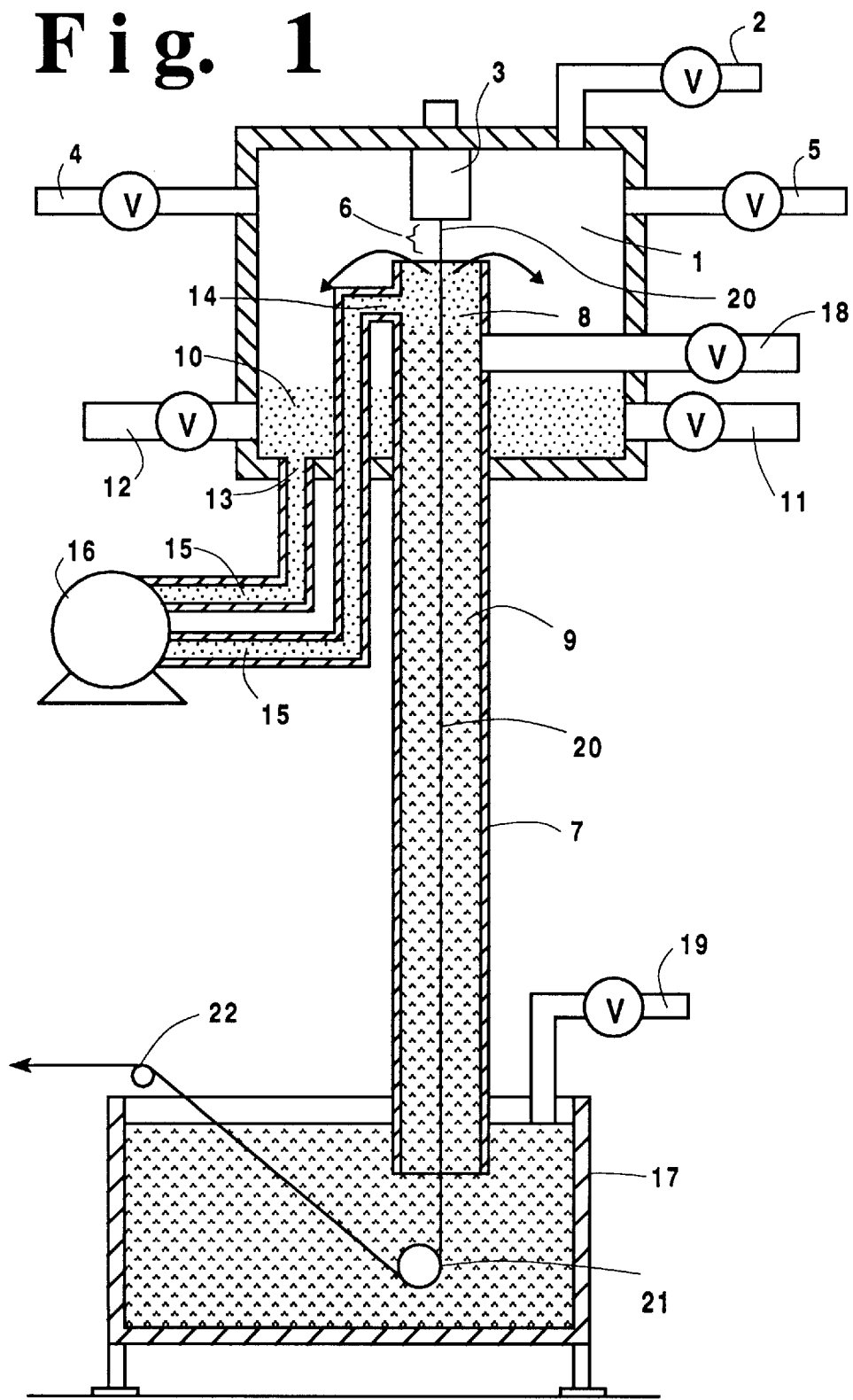
FIG. 1 shows an embodiment of the apparatus in accordance with the present invention employing several different coagulation liquids.

The process for preparing anisotropic, in particular "skinned" or asymmetric membranes, by phase inversion process in accordance with the present invention involves two steps, i.e. the spinning of a polymer solution or dope and the passage of the spun fiber membrane through a plurality of abutting coagulation media. It will be appreciated that a number of events occur when the nascent fiber is subjected to the coagulation media including solidification/precipitation as the result of the phase inversion process, leaching out the solvent components of the solution, and in some cases leaching out any non-solvents, pore forming agents and other additives. The process can also include a number of optional steps such as annealing of the spun hollow fiber membrane and/or a controlled evaporation from the nascent membrane before exposure to the coagulation media. The fibers can be produced following the teachings of this invention by a dry-wet spinning process or by a wet-wet spinning process. In the latter instance, the properties of the resulting membrane are primarily controlled by the coagulation media. In the former instance, the properties are affected by the evaporation step.

In producing anisotropic porous hollow fibers by this invention a solution of the fiber-forming material is prepared, said solution commonly being referred to as a sol, a spinning dope or a spinning solution. The dope contains the fiber forming material, typically a polymer (or mixtures of polymers) mixed with a vehicle comprised of one or more components to yield a mixture having a viscosity suitable for the spinning of hollow fibers. The vehicle with which the polymer is mixed usually has at least one solvent capable of dissolving the polymer along with one or more additives that may be nonsolvents, as is well known in the art. The hollow fibers are prepared by spinning polymeric solutions or dopes that are close to the point of incipient gelation or gels through a zone of reduced partial pressure followed by solidification in coagulation media. Advantageously, the dope is prepared by dissolving one or more polymers in a solvent system containing at least one additive such as a nonsolvent, a pore-forming agent, or surfactant.

The spinning solution may contain solvent or nonsolvent components of high vapor pressure to promote solvent evaporation in the reduced pressure gap during the dry-wet spinning process. In some instances, it may be beneficial to have a mixture of high boiling and low boiling solvents as a part of the spinning solution. However, it is not required to incorporate low temperature boiling solvents into the spinning solution to attain high levels of fiber asymmetry, and solutions comprised of high boiling solvents only can be utilized effectively.

Any polymer or combination of polymers capable of being spun into a hollow fiber membrane can be used in this invention. The art is replete with examples of such polymers and polymer blends. Similarly, any of the solvents or combination of solvents known in the art can be employed, including aprotic solvent materials such as dimethyl formamide, N-methyl pyrrolidone, dimethyl sulfoxide and the like.

Typical examples of the types of polymers useful for forming the hollow fibers by this invention are any of the solid natural or synthetic fiber-forming substances. The selection of the material for the hollow fiber may be based on the heat resistance, solvent resistance, and/or mechanical strength of the hollow fiber, as well as other factors dictated by the intended separation process in which it will be used and the conditions to which it will be subjected. Thus, for instance, the selection of the material of the hollow fiber may be based on whether or not the material of hollow fiber is intended to significantly effect the gas separation, in which event the material of the hollow fiber must have useful separation properties; or whether the intended use of the hollow fiber is as a substrate for composite membrane preparation, wherein a gas separating coating to be deposited on the substrate is intended to effect the gas separation. The hollow fibers may be flexible or substantially rigid. In the case of polymers, both addition and condensation polymers that can be fabricated in any suitable manner to provide porous hollow fibers are included. Typical polymers can be substituted or unsubstituted polymers and may be selected from polysulfones; polyetherketones; poly(styrenes) including styrene-containing copolymers such as acrylonitrile-styrene copolymers; polycarbonates; cellulosic polymers such as cellulose acetate, cellulose propionate, ethyl cellulose, methyl cellulose, etc.; polyamides and polyimides; polyethers; poly(arylene oxides) such as poly(phenylene oxide) and poly(xylylene oxide); polyurethanes; polyesters (including polyarylates); poly(alkyl methacrylates), poly(alkyl acrylates); polysulfides; polymers from monomers having alpha-olefinic unsaturation; and copolymers, grafts and blends containing any of the foregoing. Typical substituents providing substituted polymers include halogens such as fluorine, chlorine and bromine; hydroxyl groups; lower alkyl groups; alkoxy groups; monocyclic aryl; lower acyl groups; sulfonic groups, and the like.

The nonsolvent components used in formulating the dope can be solids or liquids. These components are useful in controlling the viscosity of the spinning dope as well as the porosity and other properties of hollow fibers prepared. Typical liquid nonsolvents known to be useful in formulating spin dopes are aliphatic alcohols, particularly polyhydric alcohols, such as ethylene glycol, glycerine, etc., polyethylene oxides and polypropylene oxides, surfactants such as alkylaryl polyether alcohols, alkylaryl sulfonates, alkyl sulfates, etc., triethylphosphate, formamide, aliphatic acids such as acetic or propionic acid, etc. Examples of solid material nonsolvents include polyvinylpyrrolidone, citric acid, and salts, such as zinc chloride, lithium chloride, etc.

The spinning dope should have a viscosity high enough to provide adequate strength to the hollow fiber precursor as it is extruded from the spinneret. The viscosity of the dope at the extrusion temperature should be about 1,000 to 10,000,000 centipoise, preferably about 10,000 to 1,000,000 centipoise.

The spinning dope can be prepared by first adding the solvent components of the vehicle to a suitable mixing vessel and subsequently adding the nonsolvent components and stirring until a homogeneous mixture is obtained. The fiber-forming polymer may then be added to this vehicle and mixed for a sufficient time to completely dissolve the polymer. It is advantageous to use a mechanical stirring device capable of mixing the resulting viscous mixture. Mixing of representative spinning dopes may be accomplished in less than 24 hours, often in about 8 hours.

Following the completion of the mixing process, the spinning dope must be deaerated; that is, any bubbles that have been entrained in the dope during the mixing cycle must be removed prior to spinning the dope into hollow fibers. This step is taken so that large defects in the porous hollow fiber are not formed by air bubbles causing disturbances in the hollow fiber extrusion process. Deaeration may be accomplished by subjecting the spinning dope to a vacuum in a suitable vessel or by other methods well known in the art.

Prior to being delivered to the spinneret, it is beneficial for the dope to undergo one or more filtration steps. It is desirable to remove any contaminants from the spinning dope in order to prevent flow disruptions at the spinneret, as well as to prevent large defects in the porous hollow fiber that may lead to poor mechanical properties or decreased separation efficiency. Filters with a nominal pore size rating of about 100 microns are useful for this process, although filters with nominal pore size ratings down to 20 microns or 10 microns may be preferred in some instances.

Spinnerets for use in this invention are generally of the tube-in-orifice type, in which there is a provision for providing a core fluid such as liquid or gas to be metered through the tube to form the bore of the hollow fiber. Other spinneret designs including multi-orifice spinnerets can be advantageously used to produce multiple hollow fibers. The orifice diameters for spinnerets used in this invention may be in the range of about 0.0254 cm to 0.51 cm, preferably about 0.05 cm to about 0.25 cm. As is known and recognized, the spinneret sizes will depend to a great extent on the desired hollow fiber dimensions.

The tube in the spinneret should be positioned in the center of the orifice of the spinneret in order to maintain concentricity of the resulting fiber. In addition, the bore of the spinneret tube should be large enough to permit sufficient flow of the bore fluid to yield a fiber of the required size. The outer diameter of the spinneret tube should be in the range of about 0.005 cm to about 0.25 cm, preferably about 0.013 to about 0.2 cm.

The spinning dope can be delivered to the spinneret from a supply source by any means known in the art that will provide a consistent flow at the desired rate. Representative of methods used for spinning dope delivery is to force the material from a supply vessel to the spinneret under gas pressure while metering the flow with a suitable regulating valve and rotameter assembly. Alternatively, a pump may be employed to meter the dope to the spinneret. Another method would be to employ a combination of pressure vessels and pumps to accomplish this task. Typical flow rates for dope delivered to the spinneret in practicing this invention are in the range of 0.5 cc/minute to 20 cc/minute, preferably from 1 cc/minute to 10 cc/minute. However, this is dependent upon the size of the spinneret and number and size of the orifices.

Spin stretch factors as low as about 1 or lower and as high as about 30 or more can be used. The spin stretch factor or SSF is the ratio of the velocity of the fiber as it leaves the coagulation bath to the jet velocity. The jet velocity is the average velocity of the dope in the spinneret capillary as calculated from the volume of the dope passing through an orifice per unit time and from the cross-sectional area of the orifice.

It may often be advantageous to heat the spinning dope prior to extrusion from the spinneret. This may be useful sometimes from the point of view of reducing the viscosity of the spinning dope to make it easier to handle. In addition, asymmetric porous hollow fiber with more beneficial properties may in some instances be obtained by delivering the spinning dope at elevated temperatures. Dope temperatures at the spinneret are frequently in the range of from about 20° C. to 200° C., preferably from about 30° C. to 150° C.

In order to maintain an open bore in the extruded spinning dope stream, a core fluid is delivered through the tube in the spinneret. This core fluid may be liquid or gaseous and may consist of a single component or a mixture of components. The core fluid is delivered to the spinneret tube at a rate that will yield a fiber of the desired size. The flow rate of liquid bore fluids metered to the spinneret may be measured by means of any known suitable device, such as a flowmeter. These bore fluids may be delivered to the spinneret by means of a metering pump or alternatively, by forcing the liquid from a vessel by means of gas pressure. Gaseous bore fluids may be delivered by using a metered compressed gas. Alternatively when using the dry-wet process, one can take advantage of the pressure differential between the bore of the spinneret tube and subatmospheric pressure within the chamber that encases the spinneret to aspirate the core fluid into the spinneret.

It may often be advantageous to control the temperature of the core fluid to achieve particular asymmetric hollow fiber characteristics. The temperature of the core fluid is frequently from about 0° C.–200° C., and more frequently from about 20° C.–100° C.

Advantageously, the walls of hollow fibers are sufficiently thick that no special apparatus is required for their handling. Frequently, the hollow fibers may have outside diameters of about 20 to 1,000 microns, say about 50 to 1,000, e.g., about 250 to 1,000 microns, and have walls of at least about 5 microns in thickness. The wall thickness in some hollow fibers may be up to about 200 or 300 microns. In order to provide desirable fluxes through the hollow fibers, the fibers may have a substantial void volume and the density of the hollow fiber be less than the density of the bulk material of the hollow fiber. Often the void volume of the hollow fibers is up to about 90, say about 10 to 80, and sometimes about 20 or 30 to 70 percent, based on the superficial volume, i.e., the volume contained within the gross dimensions, of the hollow fiber. Frequently, the pores have an average cross-sectional diameter less than about 20,000 Angstroms and, in some hollow fibers, the diameter is less than about 1,000 or 5,000 Angstroms. The hollow fiber of this invention is characterized by having at least one relatively dense region within its thickness in barrier relationship to fluid flow through the wall of the hollow fiber, i.e., the hollow fiber is anisotropic or asymmetric. The dense region is typically the exterior surface of the hollow fiber membrane, but can be located in the interior, particularly in the region adjacent to the surface.

FIG. 1 shows a multiple coagulant spinning apparatus adapted to produce hollow fibers by dry-wet spinning process. The apparatus includes vacuum chamber 1 that is connected through port 2 to a device that establishes a vacuum within chamber 1, such as a vacuum pump (not shown). Extending vertically into the vacuum chamber 1 from the top is spinneret 3. Spinneret 3 may be positioned partly or completely within the vacuum chamber 1. The vacuum chamber 1 is optionally further equipped with inlet and outlet ports 4 and 5 that can be utilized for intermittent or continuous circulation of gases or vapors such as, for example, inert purge gas. An example of such a gas circulation system is described by Stoy et al. in U.S. Pat. No. 3,842,151, incorporated herein by reference.

In the dry-wet spinning process of this invention, the dope and the core fluid are extruded from the spinneret 3 to form nascent hollow fiber 20, the spin dope and core fluid delivery systems are not shown. The nascent hollow fiber is transported through gap 6 that is formed by positioning the spinneret 3 at a predetermined distance above the upper end of column 7 containing the coagulation liquids. The upper end of column 7 is sealed in the vacuum chamber 1 and the lower end is placed below the level of the coagulation bath in the reservoir 17 that is open to the atmosphere. The nascent hollow fiber is exposed to gaseous atmosphere at reduced pressure in the vacuum chamber 1 for a predetermined period of time prior to contact with coagulation liquids. The exposure of the hollow fiber stream to subatmospheric pressure in the gaseous gap 6 can result in improved hollow fiber properties as compared to fibers spun at otherwise similar conditions but at an atmospheric pressure. The length of gap 6 can be from about 0.25 cm or less to about two meters or more, but generally is from about 0.5 cm to about 30 cm. The vacuum level in the chamber will vary from about 1 cm to about 75 cm Hg, and is frequently from about 10 cm Hg to about 36 cm Hg. The vacuum should not be maintained too high so as to cause rupture of the hollow fibers as they pass through the vacuum chamber or lead to an undue evaporation of the coagulation fluid.

Column 7 is a hollow elongated tube having an internal diameter generally of about 1 to 30 cm and a length of generally about 25 to 900 cm. Column 7 contains two abutting coagulant liquids arranged in series in zones 8 and 9. Depending on the miscibility of the abutting liquids, there may be some intermixing at the interface between the two zones. For convenience, the first coagulant with which the nascent hollow fiber comes into contact will hereafter be designated as the primary coagulant. One of the advantages of the present invention is that it permits the use of primary coagulant that is toxic or flammable in nature. Because the head space in the vacuum chamber 1 is enclosed and maintained at reduced pressure, most of the oxygen can be easily removed by purging chamber 1 with an inert gas prior to introduction of the coagulant liquids into the column 7 and/or continuously throughout the spinning process. The oxygen deficient atmosphere in vacuum chamber 1 will not support combustion and thereby provides a means to work safely with flammable coagulation liquids. Another advantage of the invention is that the volume of the primary coagulation liquid may constitute only a small percentage of the total coagulant volume in the column, thereby providing an economical means of utilizing expensive primary coagulation liquids.

Column 7 extends through the bottom of the vacuum chamber 1 and is preferably vertically aligned with the spinneret 3. The column 7 is sealed in the chamber 1 and the top of column 7 is open so as to permit overflow of the primary coagulant to the bottom section 10 of the vacuum chamber. The bottom section 10 can optionally serve as a reservoir for the primary coagulant and is equipped with an exit port 11 for withdrawal of the spent primary coagulant and port 12 for injection of the fresh primary coagulant. An outlet 13 is provided at a point below the surface of the liquid in the reservoir 10 and an inlet 14 is provided in the top portion of column 7. Outlet 13 and inlet 14 are interconnected by a conduit 15 which contains an in-line pump 16 for recirculation of the primary coagulant and may also, if desired, contain filters.

The bottom section of column 7 is occupied by the second or secondary coagulant 9. The bottom of the column 7 extends into container 17 that serves as a reservoir for the secondary coagulant and can also serve, if desired, as a means for extending the contact time of the fiber with the secondary coagulant. The spent secondary coagulant can be withdrawn at a predetermined rate through the port 18 and fresh secondary coagulant can be supplemented through the line 19. The secondary coagulant can be alternatively recirculated at a desired rate through the bottom section of column 7 by utilizing an appropriate recirculation means. Examples of recirculation means are provided by Stoy et al., in U.S. Pat. No. 3,842,151, incorporated herein by reference. The coagulation liquids are circulated through the column 7 countercurrently to the movement of the spun hollow fiber, as shown. However, cocurrent movement of the coagulation fluid or a combination of cocurrent and countercurrent flow can be utilized in some instances as well.

On exiting the spinneret 3, the nascent hollow fiber 20 follows the path indicated by the arrowed line. The hollow fiber traverses the gap 6 between spinneret 3 and the top of the column 7 and then sequentially contacts abutting coagulants. The hollow fiber traverses guide rolls 21 and 22, or similar bodies, and then is transported to the take up or washing equipment. The reservoir 17 can be further modified to provide more extensive washing for solidified hollow fibers.

The primary and the secondary coagulants serve to solidify the extrudate. Solvent-nonsolvent interchange takes place during the coagulation process culminating in phase inversion with the polymer-rich phase forming the solid regions and the polymer-lean phase forming the pores. In certain spinning formulations, the phase inversion process will take place only upon contact with the secondary coagulation liquid, while in other spinning formulations the secondary liquid is used for washing purposes only. Each of the coagulants or quench liquids can contain one or more components that are miscible with the solvent components of the spinning dope, and each of the coagulation liquids can be a single liquid and/or a mixture of several components that will conveniently coagulate or precipitate the dope. Typical examples of coagulation liquids are water, alcohols and their mixtures with water, aqueous salt solutions and the like. The residence/contact time in each of the coagulation baths should be long enough to permit the desired degree of diffusion of solvent components out of the fiber and sufficient diffusion of coagulant into the fiber so that an integral structure is achieved in the fiber prior to exiting the secondary coagulation liquid and being collected/transported by a take-up equipment (not shown) or other suitable collection means.

The coagulants can be optimized to obtain desired hollow fiber membrane characteristics. For instance, when making asymmetric gas separation membranes, it may be desirable to use a primary coagulant with strong nonsolvent characteristics that will quickly set up the nascent filament and promote efficient removal of the spinning dope solvents. This strong coagulant can lead to a thin nonporous membrane skin or surface layer. Conversely, it may be more desirable to have a primary coagulant that is enriched with a solvent component for the membrane forming polymer when spinning high surface porosity microfiltration or ultrafiltration membranes. Membranes of this type often require large pores and highly porous surfaces that can be formed during a slower coagulation process.

One of the advantages of preparing membranes according to this invention is that the initial coagulant can be tailored to yield optimum properties and morphology of the membrane skin, while subsequent coagulants/washing fluids can be chosen to wash the membrane free of residual solvents and/or affect the optimal morphology of the interior wall of the hollow fiber.

The chemical composition and the number of coagulation fluids employed is not limited by this invention. It has been found that alcohols and alcohol-water solutions in the first coagulation liquid followed by water as a final coagulation/washing liquid can be used for preparation of asymmetric hollow fiber gas separation membranes. Aqueous solutions of solvents, such as dimethyl formamide, N-methyl pyrollidone, or dimethyl sulfoxide, may be useful as primary coagulants followed by water as the secondary coagulant in the manufacture of ultrafiltration or microporous hollow fiber membranes.

The composition of the primary coagulation fluid at the top of the column will differ from the composition of the secondary fluid at the lower portion of the spinning column. There should be a difference of at least 1%, and preferably 5% or more, in the concentration of at least one component of the coagulation fluids injected into the different coagulation zones of the apparatus used in the process of this invention. This concentration difference would be the minimum to define a separate coagulation fluid.

The residence time of the hollow fiber in each of the coagulation fluids is not strictly limited. The vertical height of the preliminary coagulation zone can be in the range from about 0.5 cm to 500 cm, preferably 1 cm to 60 cm and most preferably 2.5 cm to 45 cm. These distances will provide a sufficient residence time for the preliminary coagulant to impart the desired properties to the hollow fiber membrane. It is understood that a transition zone between the coagulant layers may exists when miscible coagulant fluids are employed. That is, the interface between two fluids is not necessarily sharp and clearly defined, but rather a concentration gradient may exist.

The densities of the coagulation fluids should be chosen such that a low density coagulation fluid is always kept above a high density fluid at any point in a system in which intermixing between coagulant liquids is undesirable. Thus, the least dense coagulation fluid will always be found at the top of the column. Additional fluids can be progressively more dense as one moves down the column toward the reservoir 17, which will contain the most dense liquid. Selecting the fluids in such an order will help to minimize the mixing between coagulation liquids in the system. The apparatus can be further equipped with baffles or other devices positioned at the interface between the abutting liquids to further reduce the intermixing of fluids.

The coagulation column 7 may have any suitable cross-section, e.g., circular, squared, elliptical; however, a circular cross-section is preferred. The column may be divided into zones that are maintained at different temperatures. The temperature zones are preferably adjusted to correspond to the zones occupied by the respective coagulation liquids. The column can be further equipped with cooling or heating jackets for temperature control of each zone. It is often beneficial to control the temperature of the coagulation media in order to attain a desired hollow fiber morphology. The temperature of the coagulation liquids that may be the same or different is usually from about 0° C. to 100° C. and more frequently from about 10° C. to 60° C. In some embodiments, a temperature gradient between the top and the bottom of the column may exist.

Hollow fiber collection rates are typically in the range of about 15 meters per minute to about 300 meters per minute or above and more frequently in the range from about 20 meters per minute to about 150 meters per minute. The spun hollow fibers may be subjected to one or more washing stages to remove any residual solvent or nonsolvent components. Suitable washing liquids can include any material that is miscible with the solvent or nonsolvent components to be extracted, but at the same time is not harmful to the structure of the formed anisotropic porous hollow fiber.

The process of this invention is most useful for the preparation of highly asymmetric integrally skinned membranes for gas separation, wherein the material of the membrane substantially effects the separation. Such membranes contain nonporous dense regions within the membrane structure that are typically located at the membrane surface. These dense regions, or surface layers, are preferably nonporous or of extremely low porosity typically below $10^{-5}$, preferably below $10^{-6}$. Surface porosity is defined as a ratio of surface area occupied by pores to the total surface area of the membrane. For asymmetric hollow fibers utilized for gas separations where the material of the hollow fiber effects a significant portion of the separation, the relatively dense region that effects the separation is not necessarily located at the exterior surface of the hollow fiber, but can be situated somewhat away from the surface so as to be sandwiched between porous nondiscriminating regions. Accordingly, the term "asymmetric" as used herein refers to a membrane that comprises a thin dense discriminating region and one or more porous layers which provide little resistance to gas flow.

The process of this invention is further beneficial for manufacturing substrates for composite membrane preparation. The composite membranes are typically prepared by depositing a thin membrane layer on an appropriate porous substrate, wherein the deposited layer provides the gas separation medium and the substrate that can be substantially asymmetric serves primarily as the support layer. Substrate surface porosity useful for composite membrane preparation is frequently high and sometimes can be above several percent. Substrates for composite membrane manufacturing, when prepared by the method of present invention, frequently exhibit more uniform and sharp pore size distribution than membranes prepared by methods of prior art. Surfaces of these substrate materials produced by the method of this invention further appear substantially smoother and defect free, which allow for deposition of thinner defect-free gas separation barrier layer. The substrate surface layer region is frequently of a significantly reduced thickness as compared with the surface layer region of the prior art membranes. This, in turn, minimizes the interference of the substrate layer material with the gas separation characteristics of the final composite membrane. The thickness of the surface layer region of the substrates of this invention is frequently below 1,000 Angstroms, typically below 500 Angstroms, preferably below 400 Angstroms and most advantageously below 300 Angstroms. Consequently, composite membranes can be prepared from substrates of this invention that frequently exhibit improved gas separation/permeation characteristics.

The specific membrane-forming material applied to the surface of the highly asymmetric porous hollow fiber membranes of this invention to produce the composite membrane will depend upon the particular gas separation process desired. Typical of useful membrane-forming materials, which can be substituted or unsubstituted, one can mention synthetic rubbers; natural rubbers; relatively high molecular weight and/or high boiling liquids; organic prepolymers; poly(siloxanes) (silicone polymers); polyurethanes; polyamines; polyimides; polyamides; acrylonitrile-containing copolymers; polyesters; polycarbonates; cellulosic polymers such as ethyl cellulose, cellulose acetate; blends of cellulose polymers such as cellulose acetate/polymethyl methacrylate blends; polysulfones, especially modified polysulfones such as sulfonated polysulfones; poly (aklylene glycols) such as poly(ethylene glycol), poly (propylene glycol), etc.; polymers from monomers having -olefinic unsaturation such as poly(olefins), e.g., poly(4-methylpentene), poly(styrene) including poly(styrene copolymers), polyvinyls; poly(arylene oxides), e.g., poly (xylyene oxide); poly(arylene oxides) modified by halogenation or sulfonation; polycarbonates; and the like.

As indicated previously, the membrane-forming material is frequently applied to the surface of the porous substrate from a film-forming solution. This is generally performed by passing the porous substrate surface through the film-forming solution. Any suitable solvent or mixture of solvents for the membrane-forming material can be used, and those skilled in the art will appreciate and know which solvent composition is suitable for a particular membrane-forming material/hollow fiber substrate combination. The solvent is one which will dissolve the membrane-forming material and can be inorganic or organic and able to produce a homogeneous or uniform solution. The solvent used to prepare the solution of the membrane-forming material can also be a mixture of one or more solvents that will dissolve the membrane-forming material and one or more nonsolvents for the membrane-forming material. The solution should wet the surface of the porous substrate and be of a low enough viscosity that will be easily applied as an even coating. The viscosity at the temperature of application can vary from less than about 50 centipoise and is generally from about 0.5 to about 10 to 20 centipoise. The concentration of membrane-forming material in the membrane-forming solution can vary from about 0.25 to about 10 percent by weight of said solution.

Illustrative of solvents that can be used to prepare the solutions are the liquid aliphatic and aromatic hydrocarbons, e.g., toluene, pentane, hexane, 2-ethylhexane, cyclopentane, methylcyclopentane, cyclohexane, etc.; alkanols, e.g., methanol, ethanol, the propanols, cyclohexanol, etc.; ketones, e.g., acetone, methyl ethyl ketone, etc.; acids, e.g. acetic acid, propionic acid, etc.; water; esters, e.g., ethyl acetate, etc.; halogenated alkanes and dialkyl ethers; and the like; mixtures thereof may also be used. In some instances, one of said materials in the mixture may be the solvent for the membrane-forming material, while the other of said materials may be the nonsolvent; in other instances both components may be solvents for the membrane-forming material.

The thin membrane coating applied to the surface of the anisotropic porous hollow fibers produced by the vacuum process of this invention can vary in thickness from about 500 Angstroms or less to about 7,000 Angstroms or more, preferably from about 500 Angstroms to about 2,000 Angstroms; this is not a critical factor of this invention.

Figure 2:
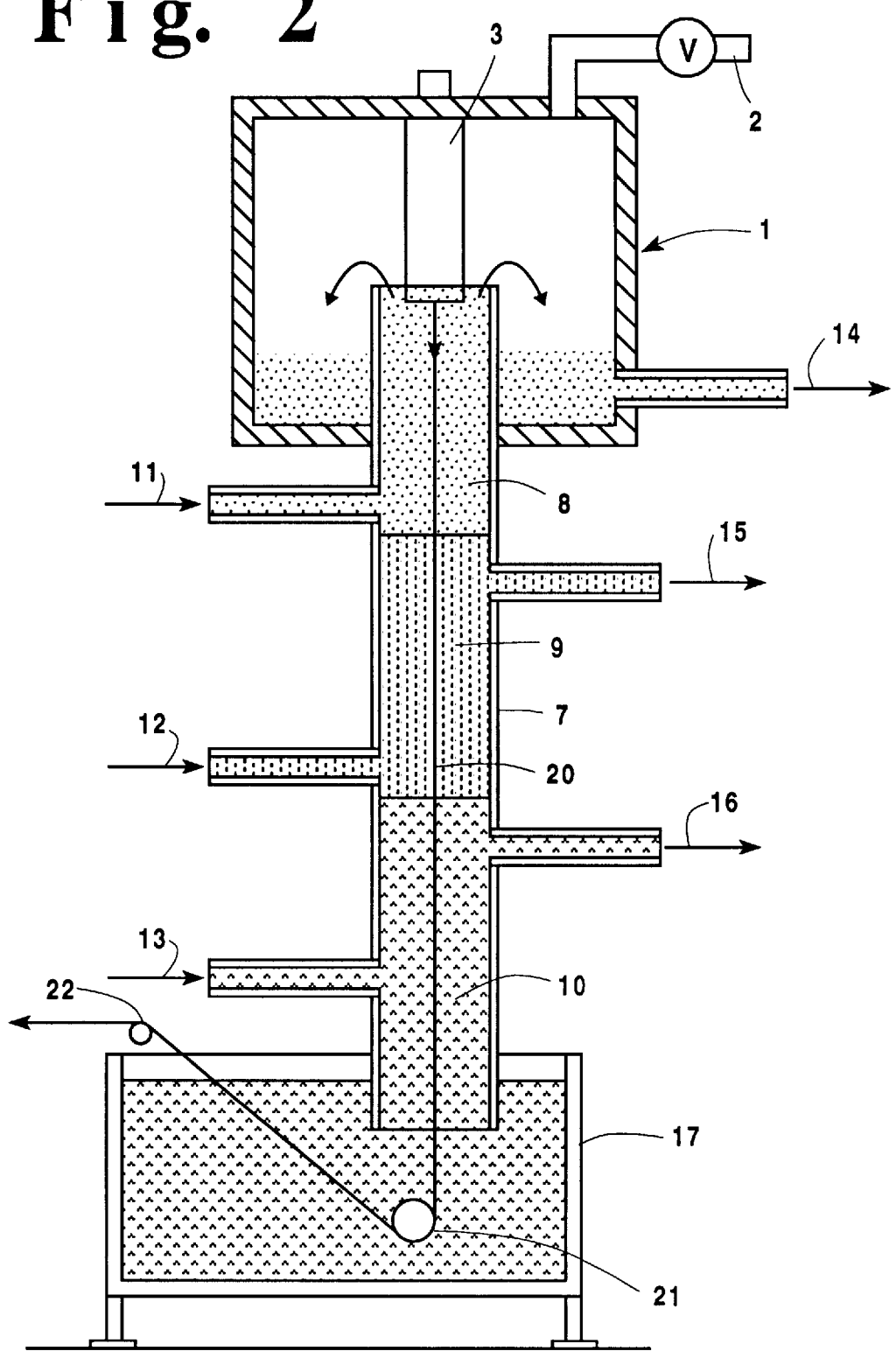
FIG. 2 illustrates another embodiment of the apparatus in accordance with the present invention employing several coagulation liquids.

FIG. 2 illustrates another embodiment of the present invention in which more than two coagulation liquids are employed and also illustrates the adaptation of the apparatus to a wet/wet spinning process. In FIG. 2, the same numerals have been used to illustrate the parts and features that are common with those of the apparatus shown in FIG. 1. In the FIG. 2 embodiment, the gap 6 between the spinneret and the first coagulation liquid has been eliminated, and the spinneret 3 extends below the liquid level in column 7 so that the nascent fiber membrane contacts the primary coagulant immediately upon leaving the spinneret 3. The vacuum chamber 1 does not have to be evacuated continuously during the spinning process. Typically the vacuum is generated through the exit port 2 during start up of the spinning process to fill the column 7 with coagulation liquids. Column 7, as illustrated in FIG. 2, contains three coagulants, the primary coagulant in the uppermost zone 8 followed by coagulants in zones 9 and 10. The coagulation liquids are introduced through ports 11, 12 and 13 and withdrawn through ports 14, 15 and 16 as shown. To prevent excessive intermixing it is desirably to place the lowest density coagulation liquid at the top of the column in zone 8 and the highest density liquid into the bottom zone 10 and container 17. Upon exiting spinneret 3, the nascent hollow fiber 20 follows the path indicated by the arrowed line. The hollow fiber contacts sequentially abutting coagulants in zones 8, 9 and 10, traverses guide roll 21 or a similar body, and then is transported to the take up or washing equipment. In some embodiments, the primary and the secondary coagulants can be highly miscible, which may make it difficult to maintain a distinct interface between the zones. To minimize intermixing, a third liquid that exhibits limited solubility in coagulant liquids in zones 8 and 10 can be placed in the intermediate zone 9 so as to maintain a distinct interface with the primary and secondary coagulants in zones 8 and 10. Furthermore, it is also possible to employ a liquid in zone 9 that is substantially inert and does not effect coagulation, but serves to separate miscible primary and secondary coagulants in zones 8 and 10.

In other embodiments, a continuous concentration gradient may be desirable or tolerable throughout the length of the column 7. In such embodiments, the coagulant composition in the column 7 represents a gradient density column.

The coagulation liquids are preferably continuously circulated through their respective zone in the column 7 by recirculation means, not shown.

Most preferably, the liquids are recirculated while a portion of the spent coagulation liquid is continuously withdrawn and replaced by injection of fresh coagulant. In some embodiments, the coagulant in one of the zones can be substantially stagnant, in particular, the liquid in the intermediate zone 9. For example, the liquid in zone 9 can be substantially stagnant if it serves primarily to prevent coagulants in zones 8 and 10 from intermixing.

The length of each coagulation zone and the chemical composition of the coagulants are optimized towards the desired hollow fiber characteristics. If desired, additional coagulant zones and loops can be provided as needed.

In order to further demonstrate the present invention, the various examples are set forth below.

EXAMPLE 1

A spinning dope was prepared by mixing 38.5 parts of polysulfone, Udel™ 3500, 6 parts of maleic anhydride, and 55.5 parts of dimethylformamide to form a homogeneous solution. The solution was deaerated and spun into hollow filaments in the apparatus shown in FIG. 1. To form a nascent hollow fiber, the spinning dope was extruded from a tube-in-orifice spinnerette encased in a vacuum chamber at a rate of 3.4 cc per minute and at the temperature of 71° C. while air was metered into the injection tube of the spinnerette.

The hollow filament stream was allowed to pass through a 10.2 cm long air gap in the vacuum chamber, in which the level of vacuum was maintained at about 14 cm Hg, before it contacted coagulation fluid in the column. The fiber first contacted a primary coagulant that consisted essentially of methanol. Methanol was continuously injected 2.5 cm below the top of the coagulation column at a rate of about 200 cc/min. The fiber continued through the coagulation column where it came into contact with a secondary coagulation fluid comprised essentially of water. The hollow fiber was transported through the coagulant bath comprised of water and collected on a spool at a speed of 38 m/minute. The spun hollow fiber was extensively washed, dried, and coated with a 6% solution of polydimethyl siloxane (Sylgard 184®) in cyclohexane. The coated fiber was heated to remove the solvent and subsequently fabricated into modules that were tested for air separation at 7.03 $Kg/cm^2$ compressed air feed pressure and at a temperature of about 23° C. and at a stage cut close to zero. The results are summarized in Table 1 below.

COMPARATIVE EXAMPLE 1

A hollow fiber membrane was spun from the same spin dope composition described in Example 1. The spinning, processing and coating conditions were identical to that described in Example 1, except that the hollow fiber was spun into a single coagulation fluid comprised essentially of water. Coated hollow fibers were prepared and tested for air separation properties as described in Example 1. The results are summarized in Table 1 below.

TABLE 1

| Sample Description | P/t* O$_2$ | O$_2$/N$_2$ |
|---|---|---|
| Example 1 | 5.2 | 4.5 |
| Comparative Example 1 | 4.8 | 4.1 |

*P/t O$_2$ = cm$^3$ (STP)/cm$^2$ × cm Hg × sec × 10$^{-5}$

It can be seen from the results in Table 1 that the membranes prepared according to teachings of present invention exhibit improved oxygen permeation rate (O2 P/t), combined with improved oxygen/nitrogen (O2/N2) separation factor, as compared to the hollow fiber membranes prepared by the prior art process.

EXAMPLE 2

A spinning dope was prepared by mixing 38.5 parts of a polyetherimide resin (Ultem 1000®, General Electric Co.), 15.0 parts of a nonionic surfactant (Triton X100®), and 46.5 parts of N-methylpyrrolidone until a homogeneous solution was obtained. The solution was deaerated and spun into hollow fiber filaments in the apparatus shown in FIG. 1. To produce the nascent hollow fiber, the spinning dope, preheated to 71° C., was extruded at the rate of 3.0 cc/minute through a tube-in-orifice spinnerette encased in a vacuum chamber, while gamma-butyrolactone was metered into the injection tube of the spinnerette at a rate of 1.2 cc/minute. A level of vacuum in the vacuum chamber was maintained at about 14 cmHg.

The hollow fiber filament stream was transported through a 2.5 cm long air gap in the chamber and then into the coagulation column. The hollow fiber first contacted the coagulant comprised of a 50/50 V/V solution of methanol/water mixture that was continuously injected 2.5 cm below the top of the coagulation column at a rate of about 200 cc/min. The hollow fiber was further transported through the coagulation column, where it came into contact with the second coagulation liquid, which consisted essentially of 0.05% solution of Triton X100® in water. The hollow fiber was drawn through the coagulation bath comprised of the second coagulation fluid at a speed of 32 m/minute and then collected on a spool. The hollow fiber was washed, dried, coated and tested as described in Example 1. The results are summarized in Table 2 below.

COMPARATIVE EXAMPLE 2

A hollow fiber membrane was spun utilizing an identical spinning dope to the one used in Example 2. The spinning, processing, and coating conditions were identical to those described in Example 2, except that the fiber was spun without the benefit of the dual coagulation processes of the present invention. This hollow fiber was coagulated in a 0.05% solution of Triton X100 in water.

The thus prepared coated hollow fibers were tested for air separation characteristics under the same conditions as those described in Example 1. The results are summarized in Table 2 below.

INVENTION EXAMPLE 3

Hollow fiber membrane was spun, processed, and coated in a manner identical with that described in Example 2 above, except that the extrusion temperature of the spinning dope was maintained at 82° C. Coated fibers from this experiment were fabricated into modules and tested according to the procedures described in Example 1. The results of the air separation test are summarized in Table 2 below.

COMPARATIVE EXAMPLE 3

Coated hollow fiber membranes were prepared under conditions identical to those in Comparative Example 2 above, except that the extrusion temperature of the spinning dope was maintained at 82° C. as in Example 3 above. Coated fibers from this run were fabricated into modules and tested according to the method described in Example 1. The results of the air separation test are summarized in Table 2 below.

TABLE 2

| Sample Designation | P/t* O$_2$ | O$_2$/N$_2$ |
|---|---|---|
| Example 2 | 2.3 | 3.1 |
| Comparative Example 2 | 1.8 | 3.1 |
| Example 3 | 2.9 | 2.9 |
| Comparative Example 3 | 2.4 | 2.9 |

*P/tO$_2$ = cm$^3$ (STP)/cm$^2$ · cm Hg · sec · 10$^{-5}$

The results summarized in Table 2 demonstrate that membranes prepared according to teachings of the present invention exhibit significantly improved oxygen permeation rates, while maintaining the same oxygen/nitrogen separation factors as membranes prepared according to the prior art process.

What is claimed is:

1. A process for making an anisotropic fluid separation hollow fiber membrane said process comprising:

(a) forming a mixture of at least one fiber-forming polymer and at least one solvent;

(b) extruding the polymer-solvent mixture as a nascent hollow fiber into a gaseous atmosphere maintained at subatmospheric pressure;

(c) conveying said nascent hollow fiber through a first liquid coagulation medium;

(d) conveying said nascent hollow fiber through at least one additional liquid coagulation medium that is abutting said first liquid medium and differs in its chemical composition from the said first liquid medium;

(e) washing the solidified hollow fiber; and (f) recovering the washed solidified hollow fiber as a highly anisotropic hollow fiber membrane.

2. The process of claim 1, further including, prior to step (d), conveying the nascent hollow fiber to, and coagulating said nascent hollow fiber in, an intermediate liquid coagulation medium that is between and abutting said first liquid coagulation medium, said intermediate liquid coagulation medium serving to prevent said first liquid coagulation medium and said additional liquid coagulation medium from mixing.

3. The process of claim 1 wherein the membrane produced is a highly asymmetric gas separation membrane that has a gas separation barrier layer less than about 1000 Å thick.

4. The process of claim 1 wherein the membrane produced has a coating of a gas separation material deposited thereon to form a composite gas separation membrane, said gas separation material substantially determining the gas separation characteristics of said membrane.

* * * * *